Nov. 29, 1966  N. LAING  3,288,048
VEHICLE VENTILATION APPARATUS
Filed June 7, 1965  6 Sheets-Sheet 1

INVENTOR
Nikolaus Laing
ATTORNEYS

INVENTOR
Nikolaus Laing 3,288,048
VEHICLE VENTILATION APPARATUS
Nikolaus Laing, 35 Hofener Weg, 7141 Aldingen, near Stuttgart, Germany
Filed June 7, 1965, Ser. No. 461,832
Claims priority, application Germany, Mar. 12, 1960,
L 35,596
19 Claims. (Cl. 98—2)

This invention relates to vehicle ventilating apparatus; this application is a continuation-in-part of my application Ser. No. 95,283, dated March 13, 1961, now abandoned. A prime example of vehicle ventilating apparatus is the car fan heater: sophisticated forms of such apparatus may provide air conditioning, not only mere heating. The invention may also be applied to apparatus without heater or air conditioning means which simply introduces fresh air into the vehicle passenger compartment. For convenience the invention will be described in relation to car heaters, but it should be understood that it has a wider application.

One of the problems facing the car heater designer is the control of the air flow therethrough at varying speeds of the car. The requirements for fresh, and commonly warmed, air do not change with the speed of the car. However, if the air inlet to the car heater is located in a region of above-ambient pressure when the car is in motion, as will be the case in many convenient intake positions, the throughput of a conventional car heater, having an axial fan, will be strongly affected by vehicle speed. The designer is then faced with the choice of locating the intake at a position which may be inconvenient, or leaving the user to regulate the flow manually. The main object of the invention in one of its aspects is to provide a car heater where above-ambient pressure at the intake has only slight effect on the throughput.

Other problems of car heater design relate to throughput control, bulk, noise and economy of current consumption for the driving motor.

The invention makes use of a cross-flow fan, i.e. a fan which comprises a bladed cylindrical rotor and guide means co-operating therewith on rotor rotation to induce a flow of air from a suction region through the path of the rotating blades to the interior thereof and thence again through the path of the rotating blades to a pressure region.

The invention depends, in one aspect, on the appreciation that the cross-flow fan has a characteristic such that, in contrast to what happens with an axial fan, above-ambient pressure at the intake makes little difference to the throughput. The invention depends further on the appreciation that with a cross-flow fan the power consumed increases with the throughput volume despite above-ambient pressure at the intake; this tends to brake the rotor and reduce the increase of throughput. By contrast, above-ambient pressure and consequently increasing throughput tend to drive an axial fan as a turbine and thus to increase the speed.

In this aspect, the invention provides, for a vehicle, ventilating apparatus comprising means defining an intake which, when the vehicle is in motion, is located in a region of above-ambient pressure and a cross-flow fan receiving air from the intake, and driving means (generally but not necessarily an electric motor). Surprisingly, and in contrast to the conventional car heater, the throughput is little affected by the vehicle speed due to the fact that the cross-flow fan, while causing air flow at low vehicle speed, acts as an automatic throttle upon air flow when high vehicle speeds set up a large above-ambient pressure at the intake.

Normally, but not necessarily, means will be provided for exchange of heat with the air flow. With a water cooled engine the heat exchanger will be circulated by the cooling water; with an air-cooled engine, the air may be passed over hot parts of the engine. With a heat exchanger means will be provided to control the amount of heat transferred to the air flow to regulate the temperature thereof: such means may be a control valve movable between a first position in which all the air passes the heat exchanger means and a second position in which all of the air by-passes the heat exchanger means. In general, and especially where a heat exchanger is used setting up appreciable resistance to the air flow, a diffuser is located downstream of the rotor, for the conversion of velocity energy to static pressure as required to overcome the resistance.

In general, adjustable throttle means will be provided to regulate the amount of the air flow independently of the rotor speed. This throttling is accompanied by a reduction in the power requirement of the fan, in contrast to the conventional axial fan where throttling may actually increase the power consumption. As a result, without absorbing an excessive wattage from the vehicle battery the fan may be over-dimensioned and normally run somewhat throttled so as to have capacity available for extra duty when needed. Particularly where the diffuser is apertured for return of boundary layer flow to the suction side of the rotor, a substantial degree of throttling (say well over 50%) may be obtained without instability.

Not every form of cross-flow fan is equally suitable for use in the apparatus of the present invention. Preferably the guide means are wholly outside the rotor, and comprise a pair of walls well spaced therefrom, the guide means and rotor in operation co-operating to set up and stabilize a vortex having a velocity profile approximating to that of a Rankine vortex, the vortex having a core region eccentric of the rotor axis and a field region wherein the flow is strongly curved about the core region. Such a fan (which will be called herein a "tangential fan") is remarkably quiet and efficient and capable of moving volumes of air which are large in relation to its size. It may also be made cheaply and has a convenient rectangular shape. It will sometimes be convenient to have the rotor in two parts, one on each side of the driving motor: the throughput of each part can be discharged separately into the vehicle passenger compartment and can be separately controlled.

Further features of the invention include a heat exchanger of arcuate form embracing the rotor on the upstream side thereof and a changeover valve, also of arcuate shape, pivotally mounted for movement between a first position in which it overlies the rotor side of the heat exchanger, thereby causing air to by-pass the heat exchanger, and a second position in which it blocks access of air to the rotor except through the heat exchanger. This arrangement is a particularly compact combination of fan, heat exchanger and heat control means. Yet other features of the invention comprise a diffuser downstream of the rotor having a belled mouth and a flap valve pivoted adjacent one wall of the belled mouth and providing for control of the throughput.

In a further aspect, the invention provides, in a vehicle, means defining an intake which when the vehicle is moving is located in a region of above-ambient pressure, a fan having its suction side connected to the intake, a by-pass around the fan, and changeover valve means operable in response to pressure at said intake to close off flow through the fan and open flow through the by-pass when the intake pressure has a value sufficient to ensure adequate air flow without the aid of the fan, and to close the by-pass and open the flow through the fan when the intake pressure falls below this value.

Certain embodiments of the invention will now be described by way of example with reference to the accompanying diagrammatic drawings in which.

Figure 1:
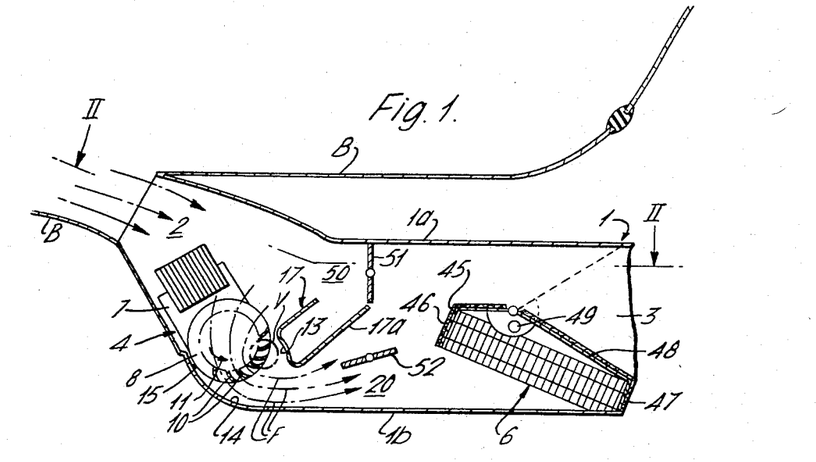
FIGURES 1 and 2 are respectively a vertical longitudinal section and a sectional plan view of a first form of car heater, with the section planes shown respectively at I—I and II—II in FIGURE 2 and FIGURE 1.
Figure 2:
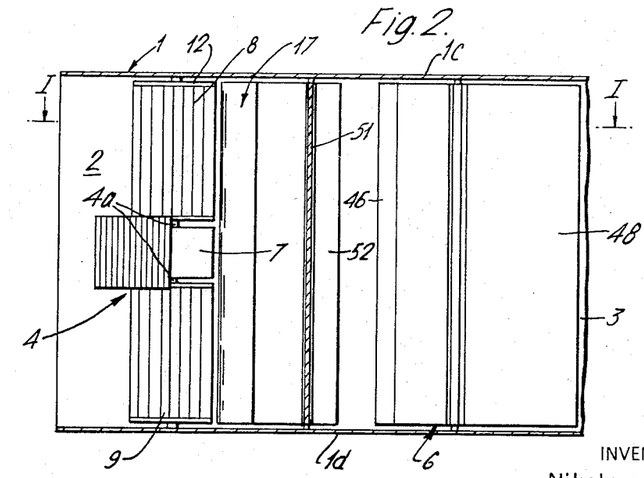

Referring to the drawings, the car heater of FIGURES 1 and 2 comprises a more or less box-shaped housing 1 having top and bottom walls 1a, 1b and side walls 1c, 1d. The front of the housing forms an air intake 2, with the bottom housing wall fairing into the top of the bonnet B of a conventional motor car shown only in part. The top of the bonnet B continues from the front edge of the upper housing wall 1b. The open rear 3 of the housing 1 is connected by ducting to the interior of the passenger compartment: the ducting is not shown and may be of conventional type. The housing 1 contains a "tangential" fan designated generally 4, and a heat exchanger 6, both extending between the parallel side walls 1c, 1d of the housing: control means are also provided as will be described.

The fan 4 comprises a small narrow electric motor 7 arranged centrally of the unit with its shaft 4a extending transversely thereof. The motor shaft carries similar cylindrical bladed rotors 8, 9 each extending between one side of the motor and the adjacent side wall of the unit. As shown in FIGURE 1 each rotor 8, 9 comprises a series of blades 10 extending parallel to the rotor axis, being concave facing the direction of rotation indicated by the arrow 11, and having their outer edges leading their inner edges. The blades are mounted between end discs 12 shown in FIGURE 2 and co-operate with guide means comprising walls 13, 14 to induce flow through the rotor. The guide wall 13 is short and converges with the rotor in the direction of rotor rotation, being concave thereto. The guide wall 14 lies opposite the guide wall 13 and diverges from the rotor with steadily increasing radius and curvature starting at the line of nearest approach indicated at 15. The line 15 is approximately opposite the line 16 of nearest approach of the guide wall 13 to the rotor: at both these lines the guide walls 13, 14 are spaced by more than a working clearance from the rotor and the guide wall 15 may be spaced by one half of the radial blade depth, or more. The guide wall 13 is the bight part of a generally U-shaped baffle indicated generally at 17 which extends across the whole width of the housing 1. The guide wall 14 is part of the bottom wall 1b of the housing 1 where it curves up towards the intake opening 2. One limb 17a of the baffle 17, which merges with the wall 13 in a rounded nose and subtends therewith an angle just less than a right angle, and co-operates with part of the housing bottom wall 1b to provide a diffuser 20 through which the air leaving the rotors passes.

In operation a vortex is set up having a core adjacent the guide wall 13 and indicated by the chain dotted flow lines V. The flow takes place through the rotor as shown by the chain dotted flow lines F and is strongly curved about the core V; the pressure at outflow is increased in the diffuser 20. The velocity profile at outflow from the rotor approximates to that of a Rankine vortex. It is seen by reference to FIGURE 1 that the flow of air passes from the inlet through the path of the rotating blades into the interior of the rotor and thence out through the path of the rotating blades to the outlet of the rotor so that the air is guided twice through the path of the rotating rotor blades. The design and construction of the fan, more particularly the rotors and guide walls 13, 14, follows the principles enunciated in British Patent 876,611 which should be referred to. This specification also describes in more detail how the flow takes place.

The heat exchanger 6 takes the form of a perforated rectangular block mounted at the rear of the housing 1, extending the width thereof and running obliquely downwards to the bottom of the housing with its front end 45 midway between the top and bottom of the housing. The front end 45 of the heat exchanger block 6 is covered by an insulated baffle 46, and the rear end by an insulated baffle 47: thus air can only flow through the thickness of the block. The baffle 46 pivotally mounts a flap valve 48 which is insulated on the side away from the heat exchanger (i.e. the downstream side).

It will be seen that when the flap valve 48 assumes the position shown in full lines, none of the air leaving the housing through the opening 3 is heated by the heat exchanger. When the flap valve 48 assumes the position shown in dotted lines, all the flow takes place through the heat exchanger. At intermediate positions of the flap valve 48 the flow is partly heated and partly unheated. The insulation on baffles 46, 47 and flap valve 48 minimize leakage of heat to the outflow when the flap valve is closed. To further reduce this leakage small holes 49 are formed leading to the exterior of the housing from downstream of the heat exchanger block, so as to prevent a return flow of air through the heat exchanger.

It will be seen that the baffle 17 defines with the upper wall 1a of the housing 1 a by-pass 50 for flow past the fan. A normally closed butterfly valve 51 is arranged to control flow in the by-pass. Another butterfly valve 52 is located in the diffuser 20 to control flow through the fan 4. Both butterfly valves 51, 52 are provided with manual control means (not shown) within reach of the driver.

Figure 3A:
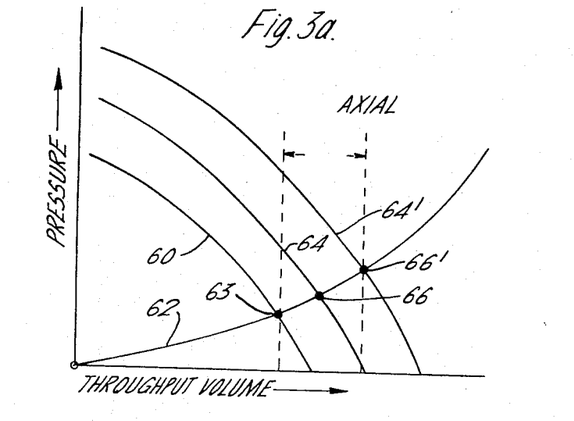
FIGURES 3a and 3b are graphs showing the relation of pressure to throughput volume in an axial and a "tangential" fan respectively.
Figure 3B:
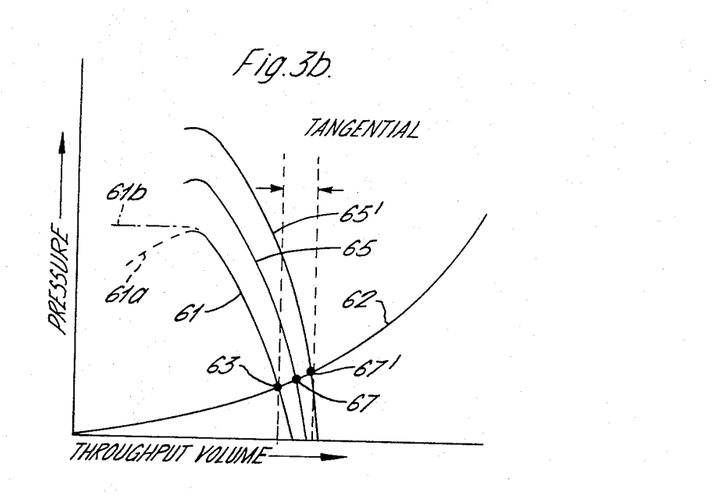
Figure 4A:
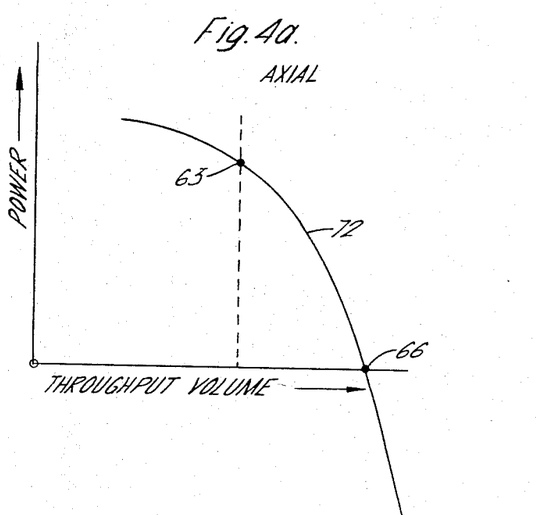
FIGURES 4a and 4b are graphs showing the relation of power consumption to throughput volume in an axial and a "tangential" fan respectively.

The operation of the car heater as so far described will now be explained with reference to FIGURES 3a, 3b and 4a, 4b assuming that the by-pass 50 is closed, and the butterfly valve 52 is open. FIGURES 3a and 4a relate to a conventional axial fan and FIGURES 3b, 4b relate to a "tangential" fan such as the fan 4 above described. FIGURES 3a and 3b show characteristic curves i.e. graphs of pressure against throughput for given rotor speed, for the axial and "tangential" fans. The curves 60, 61 relate to operation with the car stationary, i.e. ambient pressure at the intake 2. It will be seen that whilst in the axial fan pressure increases steadily as the fan is throttled to zero throughout, with the "tangential" fan the pressure increases fairly rapidly to a peak on throttling and then enters an unstable region, shown dotted at 61a. By allowing recirculation of slow flow however, as will be later described, the unstable region can be reduced: with recirculation the characteristic follows the stable curve position 61b. In both 3a and 3b the system resistance curve is shown at 62 and the working point at 63, where the characteristic intersects the resistance curve.

FIGURES 3a and 3b show further characteristic curves 64, 64′ and 65, 65′ which relate to progressively increasing above-ambient intake pressure due to forward motion of the car. The working point is in each case at the intersection of the system resistance curve 62 and the relevant characteristic: such working points are shown at 66, 66′ and 67, 67′ respectively. Because of the shape of their respective characteristics, the axial fan produces a much greater increase of throughput than the "tangential" fan as the intake pressure increases.

Figure 4B:
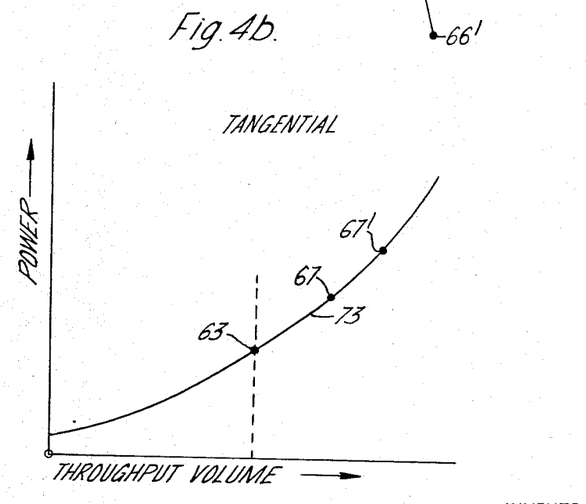

However, the characteristic shown in FIGURES 3a and 3b are taken at constant rotor speed, and the effect of increasing intake pressure on the rotor speed has now to be considered. FIGURES 4a and 4b show curves, designated 72, 73, of power consumption against throughput for the axial and "tangential" fan respectively: on such curve the working points 63, 66, 66′ and 63, 67, 67′ are shown. The power consumption curves of the two fans are fundamentally different in that increasing throughput through the axial fan reduces power consumption until, at point 66′, the fan operates as a turbine, while increasing throughput through the "tangential" fan increases power consumption. Consequently the speed of the axial fan will tend to increase, while the speed of the "tangential" fan will drop. Accordingly at high vehicle speeds the characteristic of the axial fan to be considered will lie to the right of curve 64′ and the volume of throughput will be greater, while the characteristic of the "tangential" fan will lie to the left of curve 65′ giving a reduced throughput.

As a result, the throughput of the car heater FIGURES 1 and 2 will be little affected by changes in vehicle speed, in contrast to a comparable conventional car heater where the throughput increases greatly. The fan 4 thus acts as an automatic throttle at higher speeds. However, if extra throughput is required at high vehicle speed, the by-pass valve 51 can be opened.

The fan 4 has other advantages besides its capacity to act as an automatic throttle. Thus, it is relatively silent, small inrelation to the throughput, and economical of driving power, which is always an advantage in vehicles, where battery drain has to be minimized. The housing is relatively flat and long, which may sometimes be a more convenient shape than the usual cubic casing of the conventional car heater. However, the fan 4 can readily be adapted to any desired shape of housing.

Naturally, the car heater described may be modified in various ways. If desired the by-pass 50 can be eliminated, allowing for a larger rotor or a smaller housing. The rotor can be in one part, extending all the way between the side walls 1c, 1d and the motor can be located in a "bulge" on one side wall. Various other modifications are illustrated in later figures. The intake 2 can be located anywhere on the vehicle where above-ambient pressure is set up on motion.

Figures 5, 6:
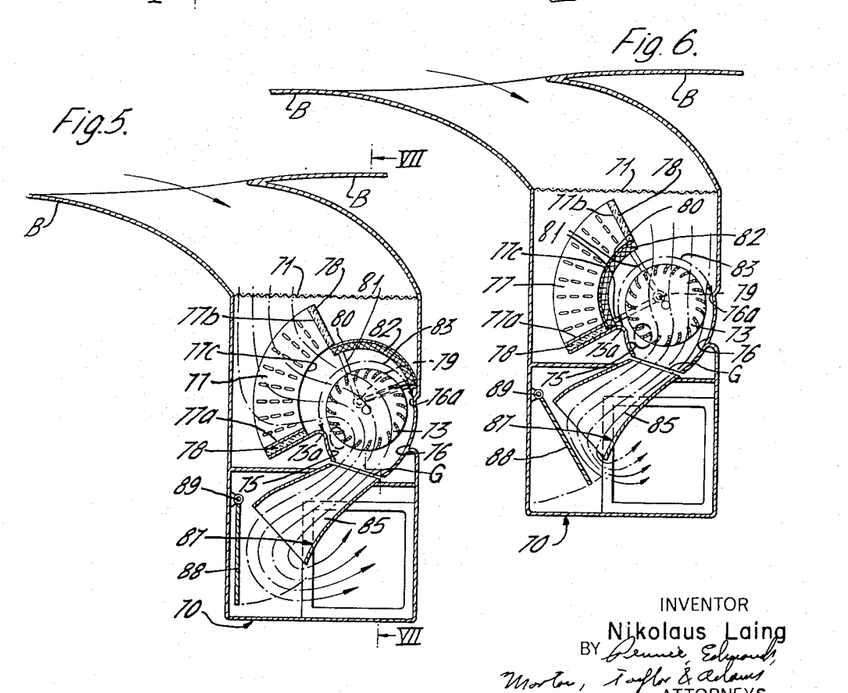
FIGURES 5 and 6 are sectional views of a further form of car heater, showing two different conditions of adjustment.
Figure 7:
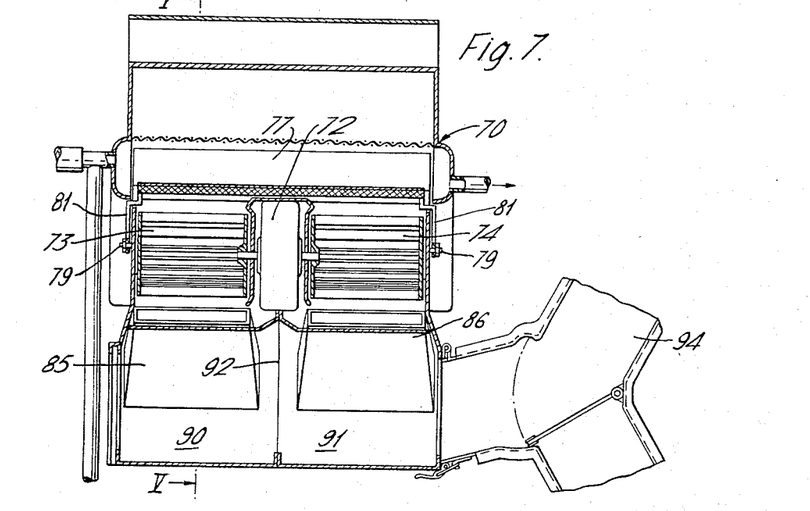
FIGURE 7 is a sectional view on the line VII—VII in FIGURE 5 of the car heater thereof.

Another form of car heater is illustrated in FIGURES 5 and 7. This includes a box-like housing 70 open at the top and mounting a filter 71 over the whole extent of the opening. The housing is connected to an intake similar to that of FIGURE 1. A small electric motor 72 centrally mounted in the housing drives a pair of rotors 73, 74, each rotor co-operating with guide walls 75, 76. The motor, rotor and guide walls operate on the principles described above with reference to FIGURES 1 and 2 and further description of these parts will accordingly be unnecessary. At the left hand side of the housing 1, as seen in FIGURES 5 and 6, is mounted a heat exchanger 77 in the form of an arcuate block which extends the whole length of the housing. The heat exchanger block is closed at the ends of the arc 77a, 77b which are covered by heat insulating material 78. The arc defined by the inner side 77c of the heat exchanger is centered upon an axis shown at 79 which lies close to the axis of the rotors 73, 74. A control valve in the form of an arcuate plate 80 extending the whole length of the housing is supported upon arms 81 for angular movement about the axis 79. The inner surface of the plate 80 is covered by heat insulating material 82.

The arc over which air can enter either rotor is indicated at 83 in FIGURES 5 and 6, this arc being defined between the lines of nearest approach of the guide walls 75, 76 to the rotors 73, 74 which lines are shown at 75a, 76a. The heat exchanger block 77 extends over about half this arc 83 from the end defined by the line 75a. The plate 80 is movable between the position shown and a second position overlying the whole of the inner side of the heat exchanger 77. In the position shown in FIGURE 5, the plate extends over that part of the arc 83 left open by the heat exchanger: thus air can only enter the rotors 73 through the heat exchanger. When the plate 80 overlies the heat exchanger 77 as in FIGURE 6, no air can pass through it. In the first position, therefore, all the flow is heated while in the second none is, and heat leakage is minimized by the insulating material 78, 82: in intermediate positions of the plate 80, part of the throughput is heated and part is not.

Each rotor 73, 74 discharges into a diffuser 85, 86, in order to transform the velocity energy of the air flow into pressure energy; the larger end of the diffuser is belled as shown at 87, FIGURE 4. Adjacent the belled end of each diffuser 85, 86 a flap valve 88 is pivoted at 89. By pivoting this valve 88 from the inoperative position shown in FIGURE 5 towards the belled diffuser mouth the corresponding rotor 85, 86 can be throttled to a low throughput, as indicated in FIGURE 6.

The smaller end of each diffuser 85, 86 is spaced from the adjacent guide walls 75, 76 to provide a gap which is preferably larger near the wall 76. Slow boundary flow adjacent the guide walls passes out through the gap and is recirculated to the suction side of the rotor. This improves the characteristic, as explained with reference to FIGURE 3b; it also reduces mixing losses in the diffuser and helps to improve the efficiency of conversion of velocity to pressure energy.

The part of the housing 70 beyond the motor 72 and rotors 73, 74 is divided into two chambers 90, 91 by a thin flexible partition 92, and one of the diffusers 85, 86 discharges into each chamber. One chamber 91 leads to a windscreen demister (not shown) and front seat heater outlet (not shown) through ducting 94. The other chamber 92 leads to a separately controllable outlet (not shown) in another part of the car. The chambers 90, 91 together form a noise-suppressing resonator. Noise from a "tangential" fan has a well-defined main frequency and is thus readily silenced by this method.

The car heater of FIGURES 5 to 7 operates at substantially constant throughput no matter what the vehicle speed, for the reasons explained with reference to FIGURES 3a to 4b.

However, the invention contemplates that the advantage of substantially constant throughput despite the varying intake pressure may be sacrificed if desired. Thus for example, the construction of FIGURES 5 to 7 may also be used with an intake situated so as to be unaffected by vehicle speed. If desired the intake may be subject to pressure change and the heater may operate with the fan at low speeds and on ram air at higher speeds.

Figure 8:
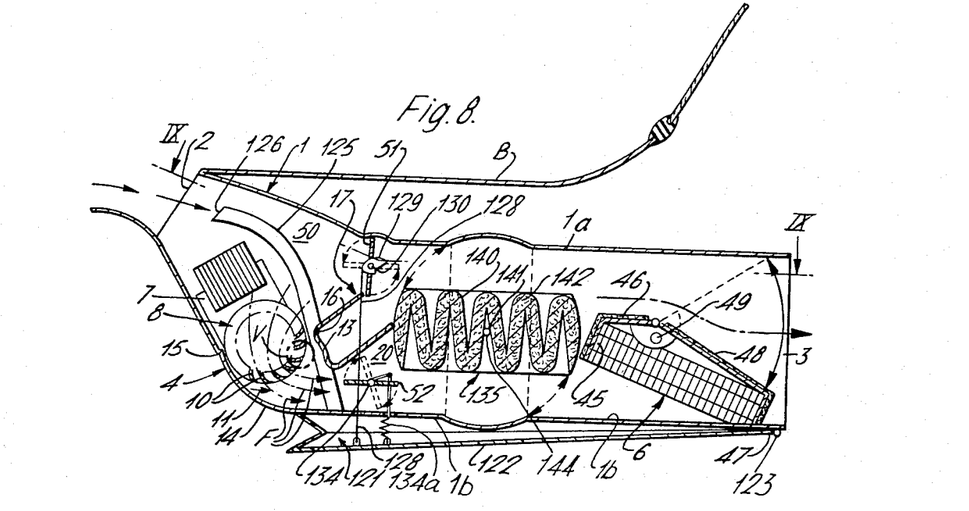
FIGURES 8 and 9 are views similar to FIGURES 1 and 2 of a further form of car heater.
Figure 9:
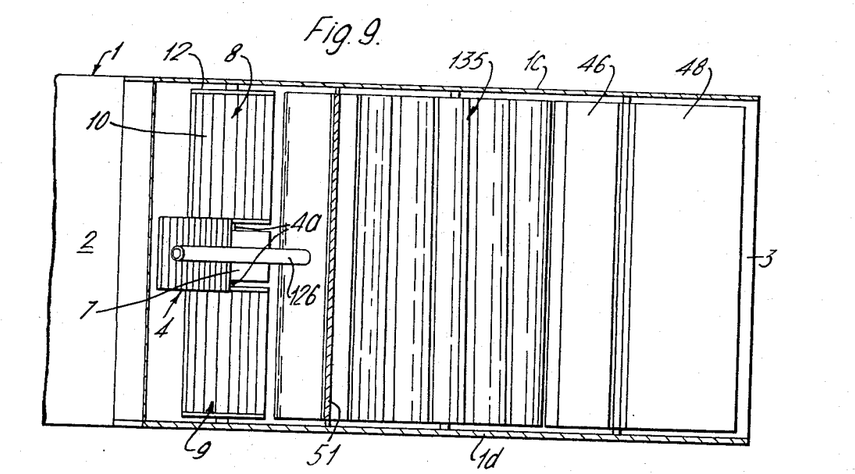

FIGURES 8 and 9 show a modification of the car heater of FIGURES 1 and 2 which provides for the changeover just mentioned. Similar parts in the two constructions are designated by the same reference numerals and will need no further description.

In this embodiment there is situated below the bottom wall 1b of the housing 1 a bellows 121 having a bottom plate 122 co-operating with the bottom housing wall and pivoted transversely thereto at 123 adjacent the rear end 3 of the housing. A tube 125 located centrally of the housing presents an open end 126 opposite about the middle of intake 2 and conveys pressure to the interior of the bellows 121. It will be appreciated that this tube 125 acts in the manner of Pitot tube: that is to say, as the car travels more rapidly, the velocity of the air entering the intake 2 increases and the pressure within the bellows 121 also increases. A cord 128 unwinding from a cam 129 mounted on a transverse spindle 130 is connected to the bottom plate 122 of the bellows 121. The butterfly valve 51 which controls the by-pass duct 50 is in this embodiment mounted on the spindle 130. As the velocity of air entering the intake opening 2 increases the bottom of the bellows 122 descends and the butterfly valve 51 opens. The butterfly valve 52 in the diffuser 20 is mounted upon a transverse pivot axis shown at 134 and connected by a spring 134a to the bottom plate 122 of the bellows 121 so that as the butterfly valve 51 opens, the butterfly valve 52 closes the air passage through the diffuser 20. It will be seen that by suitable shaping of the cam 129 any desired relation between the passage which is presented by the butterfly valves can be obtained.

A filter 135 is also provided comprising a pair of perforated elements 140, 141 which extend from side to side of the housing 1, which are pleated, and between which is contained filter material 142 such as loose fibres or granular carbon 42 or other active material. The filter 135 forms a unit and is pivoted to the side walls of the housing on a transverse pivot axis shown at 144. The filter 135 is adapted for manual control by means of a knob or lever (not shown) located on the outside of the housing.

As will be understood from the foregoing, as the pressure builds up at the intake 2 due to increasing car speed, so the diffuser 20 is closed by the butterfly 52, while the by-pass passage 50 is opened. The motor 7 consumes little current with the fan 4 throttled and may be left running even when the diffuser 20 is fully closed and the by-pass 50 fully open: alternatively the movement of the bellows 121 can be made to operate a control switch so as to open-circuit the motor in this condition.

It is contemplated that cooling water from the car engine will normally be circulated in the heat exchangers 6 of the car heaters herein described. However, FIGURE 3 shows a boiler which may be used as an alternative or supplementary source of hot water for the heat exchanger, e.g. if it is desired to warm the passenger compartment when the car is stationary for a long time.

Figure 10:
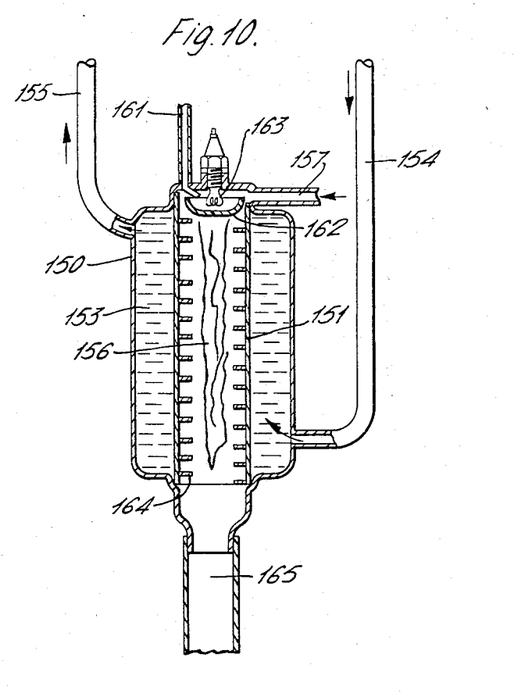
FIGURE 10 is a sectional view of a water heater for use with one or other of the car heaters of earlier figures.

The boiler comprises two tubes 151 and 152 which are closed at both ends and form an annular chamber 153. This annular chamber 153 contains water which circulates through pipes 154 and 155 and through the heat exchanger of the car heater. Air impelled by a fan or tapped directly from the car heater by an intercepting diffuser (e.g. as indicated at D in FIGURE 8) enters the combustion chamber 156 from the tube 157 within the tube 151, preferably in the tangential direction. A metering pump preferably driven by a separate miniature motor, delivers fuel through pipe 161 into dish 162. An igniter element 163 provides initial ignition. The combustion chamber 156 contains baffles 164 for improving the conditions of heat transfer, and exhaust is discharged through pipe 165 under the vehicle.

I claim:

1. In a vehicle having a passenger compartment, ventilating apparatus comprising: means defining an inlet which, when the vehicle is in motion, is located in a region of above-ambient pressure; a fan of the cross-flow type comprising a bladed cylindrical rotor mounted for rotation about its axis in a predetermined direction and guide means co-operating therewith on rotation thereof in said predetermined direction to set up a flow of air from a suction side through the path of the rotating blades of the rotor to the interior thereof and thence again through the path of the rotating blades to a pressure side, the suction side being connected to said inlet and the pressure side to the passenger compartment; driving means for the rotor; and adjustable throttle means to regulate said air flow independently of the rotor speed.

2. Apparatus as claimed in claim 1 further comprising a diffuser located immediately downstream of the rotor.

3. Apparatus as claimed in claim 2, wherein the diffuser is apertured for return of boundary flow to the suction side.

4. In a vehicle having a passenger compartment, ventilating apparatus comprising: means defining an inlet which, when the vehicle is in motion, is located in a region of above-ambient pressure; a fan of the cross-flow type comprising a bladed cylindrical rotor mounted for rotation about its axis in a predetermined direction and guide means co-operating therewith on rotation thereof in said predetermined direction to set up a flow of air from a suction side through the path of the rotating blades of the rotor to the interior thereof and thence again through the path of the rotating blades to a pressure side, the suction side being connected to said inlet and the pressure side to the passenger compartment; driving means for the rotor; means for exchange of heat with said air flow; and means to control the amount of heat transferred between the heat exchange means and the air flow whereby to regulate the temperature of the latter.

5. Apparatus as claimed in claim 4, wherein the heat control means is a control valve movable between a first position in which all the air passes the heat exchange means and a second position in which all of the air by-passes the heat exchange means.

6. Apparatus as claimed in claim 5, wherein the control valve is downstream of the heat exchange means.

7. In a vehicle having a passenger compartment, ventilating apparatus comprising: means defining an inlet which, when the vehicle is in motion, is located in a region of above-ambient pressure; a fan of the cross-flow type comprising a bladed cylindrical rotor mounted for rotation about its axis in a predetermined direction and guide means co-operating therewith on rotation thereof in said predetermined direction to set up a flow of air from a suction side through the path of the rotating blades of the rotor to the interior thereof and thence again through the path of the rotating blades to a pressure side, the suction side being connected to said inlet and the pressure side to the passenger compartment; an electric motor driving the rotor; a diffuser immediately downstream of the rotor; adjustable throttle means to regulate said air flow independently of the rotor speed; means for exchange of heat with said air flow; and a control valve movable between a first position in which all the air passes the heat exchange means and a second position in which all of the air by-passes the heat exchange means.

8. In a vehicle having a passenger compartment, ventilating apparatus comprising: means defining an inlet which, when the vehicle is in motion, is located in a region of above-ambient pressure; a fan comprising a bladed cylindrical rotor mounted for rotation about its axis in a predetermined direction and guide means co-operating therewith on rotation thereof in said predetermined direction to set up a flow of air from a suction side through the path of the rotating blades of the rotor to the interior thereof and thence again through the path of the rotating blades to a pressure side, the suction side being connected to said inlet and the pressure side to the passenger compartment; driving means for the rotor, means providing a by-pass around the fan, and changeover valve means operable in response to pressure at said intake to close off flow through the fan and open flow through the by-pass at a predetermined intake pressure and to close the by-pass and open the flow through the fan when the intake pressure falls below said predetermined value.

9. Apparatus as claimed in claim 8, wherein the changeover valve means comprises a pair of butterfly valves, a first controlling the fan throughput a second controlling the by-pass, and means interconnecting said valves for movement together.

10. Apparatus as claimed in claim 9 including a bellows subject to said intake pressure and controlling the valve interconnecting means.

11. Vehicle ventilating apparatus comprising a housing having an inlet to face forwardly of the vehicle; an outlet for supply of air to the interior of the vehicle; a heat exchanger for heating air flowing between inlet and outlet; a fan in the housing; a by-pass past the fan; and flow control means in the housing sensitive to ram air pressure and effective, when the ram air pressure is zero, block the by-pass and permit flow through the housing on operation of the fan, and, when the ram air pressure rises, to open the by-pass and permit flow through the housing by reason of ram air pressure.

12. A vehicle heater-air conditioner unit comprising a housing defining inlet and outlet openings, at least one bladed cylindrical rotor mounted for rotation in the housing wherein the rotor axis is perpendicular to the flow of air through said rotor, a motor driving the rotor, guide means associated with the rotor and forming inlet and outlet arcs therewith to guide air twice through the blades thereof in a direction transverse to the rotor axis, and heating means within the housing; the rotor and guide means being arranged within the housing to draw air from the inlet and discharge it to the outlet and the heating means being arranged in the path of air flow between said inlet and outlet and said heating means being in the form of a heat exchanger of arcuate form located adjacent to and spaced from the rotor over its inlet arc and being convex thereto, the heat exchanger extending the length of the rotor and over substantially half its inlet arc, and said unit further comprising a valve of arcuate form which is pivotally mounted in the housing and which is movable between a first position where it lies closely adjacent the heat exchanger over the whole area thereof facing the rotor whereby to block passage of air therethrough and a second position wherein said valve blocks excess of air to the rotor except through the heat exchanger.

13. A unit as claimed in claim 12, wherein the arcuate valve is heat-insulated on its downstream side.

14. A unit as claimed in claim 12, having a filter upstream of the heat exchanger.

15. A vehicle heater-air conditioner unit comprising a housing defining inlet and outlet openings, at least one bladed cylindrical rotor mounted for rotation in the housing, a motor driving the rotor, guide means associated with the rotor to guide air twice through the rotating blades of the rotor in a direction transverse to the rotor axis, a diffuser having a smaller end positioned to receive flow from the rotor and a larger end providing an outlet from the diffuser and at least a pair of opposed walls diverging in the direction of flow and having outwardly turned portions at the diffuser outlet the latter thereby having the form of a belled mouth, a flap valve pivotally mounted about an axis adjacent one of said walls and movable between a first position in which it lies close to the outwardly turned portions of both said walls to throttle flow through said belled mouth and a second position wherein flow through the belled mouth is unaffected, and heating means within the housing.

16. A vehicle heater-air conditioner unit comprising a housing defining an inlet opening and a pair of separate chambers having separate outlets, a pair of bladed cylindrical rotors mounted for rotation in the housing about a common axis, a motor driving the rotors, guide means associated with each rotor to guide air twice through the rotating blades of the rotor in a direction transverse to the rotor axis, a pair of diffusers each having a smaller end positioned to receive flow from one of said rotors and a larger end leading from the diffuser into a corresponding one of said chambers, a pivotally mounted flap valve within each said chamber for separate control of the flow through said outlets, heat exchanger means within the housing positioned between the inlet side of the rotors and said inlet opening, a by-pass passage extending between said inlet opening and the inlet side of the rotors, and adjustable changeover valve means for varying the amount of air flowing through the heat exchanger means to the inlet side of the rotors with respect to the amount of air flowing through the by-pass passage to the inlet side of the rotors.

17. A vehicle heater-air conditioner unit comprising a housing defining an inlet opening and a pair of separate chambers having separate outlets, a pair of bladed cylindrical rotors mounted for rotation in the housing about a common axis, a motor driving the rotors, guide means associated with each rotor to guide air twice through the rotating blades of the rotor in a direction transverse to the rotor axis, a pair of diffusers each having a smaller end positioned to receive flow from one of said rotors and a larger end leading from the diffuser into a corresponding one of said chambers, a pivotally mounted flap valve within each said chamber for separate control of the flow through said outlets, and heat exchanger means within the housing; said chambers having a common wall of thin material acoustically coupling the chambers to form a resonator tuned to suppress the main frequency of noise due to rotation of the rotors.

18. A vehicle heater-air conditioner unit comprising a housing defining inlet and outlet openings, at least one bladed cylindrical rotor mounted for rotation in the housing wherein the rotor axis is perpendicular to the flow of air through said rotor, a motor driving the rotor, guide means associated with the rotor and forming inlet and outlet arcs therewith to guide air twice through the blades thereof in a direction transverse to the rotor axis, and heating means within the housing; the rotor and guide means being arranged within the housing to draw air from the inlet and discharge it to the outlet and the heating means being arranged in the path of air flow between said inlet and outlet and located adjacent to and spaced from the rotor over its inlet arc, the heat exchanger extending the length of the rotor and over substantially half its inlet arc, and said unit further comprising a valve which is pivotally mounted in the housing and which is movable between a first position where it lies closely adjacent the heat exchanger over the whole area thereof facing the rotor whereby to block passage of air therethrough and a second position wherein said valve blocks excess of air to the rotor except through the heat exchanger.

19. In a vehicle having a passenger compartment heat exchanger apparatus comprising: means defining an inlet which, when the vehicle is in motion, is located in a region of above-ambient pressure; a tangential fan comprising a bladed cylindrical rotor mounted for rotation about its axis in a predetermined direction; guide means cooperating with said rotor when it is rotated to set up a flow of air from a suction side thereof through the path of the rotating blades to the interior thereof and thence again through the path of the rotating blades to a pressure side, said suction side being connected to said inlet and said pressure side to a passenger compartment; a heat exchanger positioned in the path of air flow between said inlet and said passenger compartment; and an electric motor for driving said rotor with said motor having a power output substantially greater than that necessary to drive said rotor under maximum air flow conditions through said apparatus when said inlet is at ambient pressure; any tendency of throughput of air through the apparatus to increase caused by increase of pressure above ambient in said inlet when said vehicle is in motion being minimized by increase of power consumed by said rotor which tends to brake the same.

(References on following page)

References Cited by the Examiner

UNITED STATES PATENTS

| | | | |
|---|---|---|---|
| 152,031 | 6/1874 | Baker | 236—13 |
| 998,767 | 7/1911 | Fulton | 236—38 |
| 1,013,424 | 1/1912 | Murphy | 236—38 |
| 1,608,938 | 11/1926 | Henshall | 230—125 |
| 1,665,211 | 4/1928 | Kennedy. | |
| 1,787,653 | 1/1931 | Anderson | 238—114 |
| 1,816,217 | 7/1931 | Harnett | 165—54 |
| 1,849,061 | 3/1932 | Anderson | 55—222 |
| 1,889,588 | 11/1932 | Anderson | 165—103 |
| 1,904,918 | 4/1933 | Ewald | 236—38 X |
| 1,975,130 | 10/1934 | Stewart | 236—38 |
| 2,148,388 | 2/1939 | Wyld | 230—233 |
| 2,155,279 | 4/1939 | McMahan | 110—72 |
| 2,295,750 | 9/1942 | Norris | 98—2.5 |
| 2,737,169 | 3/1956 | Kimberlain | 126—350 |
| 2,796,820 | 6/1957 | Moore | 165—43 X |
| 2,894,443 | 7/1959 | Rashussern | 98—2 |

MEYER PERLIN, *Primary Examiner.*